Sept. 30, 1969  B. W. GRIFFIN ET AL  3,469,458
RATE GYROSCOPES

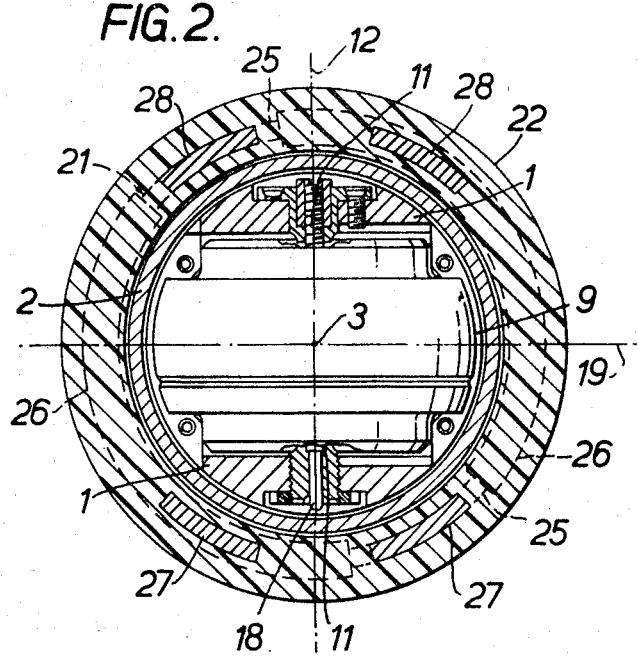
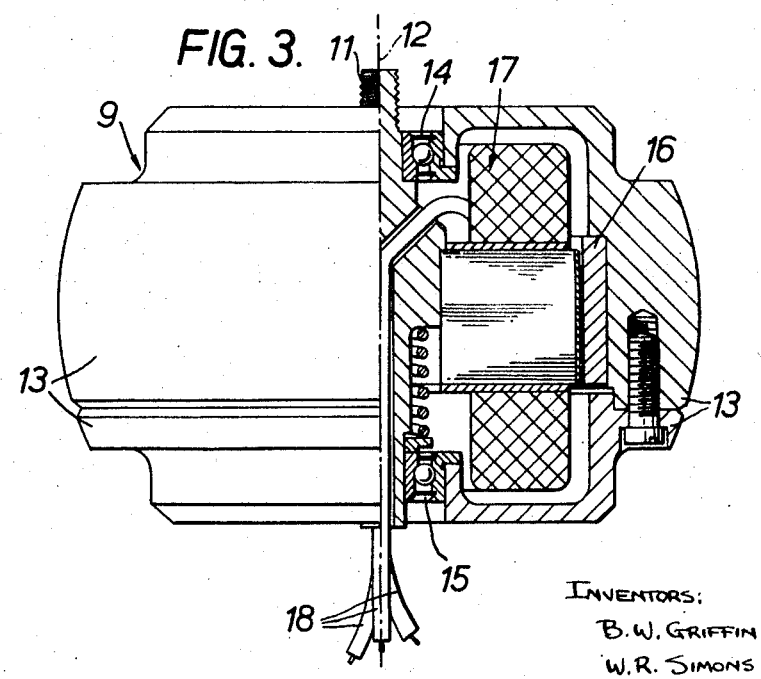

Filed Nov. 4, 1966  4 Sheets-Sheet 3

INVENTORS:
B.W. GRIFFIN &
W.R. SIMONS
BY: Moore & Hall
ATTORNEYS.

United States Patent Office 3,469,458
Patented Sept. 30, 1969

3,469,458
RATE GYROSCOPES
Brian William Griffin and William Richard Simons, Cheltenham, England, assignors to Smiths Industries Limited, London, England, a British company
Filed Nov. 4, 1966, Ser. No. 592,203
Claims priority, application Great Britain, Nov. 8, 1965, 47,342/65
Int. Cl. G01c 19/30, 19/28
U.S. Cl. 74—5.46          13 Claims

ABSTRACT OF THE DISCLOSURE

A rate gyroscope is encircled by two electromagnets that are energized with direct current alternately to check freedom for precession, the electromagnets attracting a ferromagnetic spindle of the gyro rotor in opposite senses about the precession axis. Speed of rotation of the rotor is checked by detecting the modulation component induced in the electric supply to a hysteresis motor driving the rotor, energization of the electromagnets being inhibited in the absence of such component.

---

This invention relates to rate gryoscopes.

According to the present invention, a rate gyroscope has a rotor that is carried by a gimbal structure for precession against the action of a resilient restraint, and two electromagnets that are individually energizable with direct electric current for exerting magnetic attraction on ferromagnetic means carried by the gimbal structure, the arrangement being such that the attraction due to each electromagnet acts upon the ferromagnetic means with moment about the axis of precession so as thereby to exert torque for displacing the gimbal structure angularly about the precession axis, and the sense of the torque, and thereby the sense of any resultant angular displacement of the gimbal structure about the precession axis, is dependent upon which of the two electromagnets is energized.

With the above rate gyroscope, the freedom or otherwise of the rotor to precess can be checked simply by energizing the two electromagnets in turn. If there is freedom for precession, then this will be indicated in each case by the resulting signal produced by the rate gyroscope, the energization of either electromagnet producing a predetermined angular displacement about the precession axis that, since it is analogous to an angular displacement produced by precession, is represented by the output signal from the gyroscope as a corresponding angular rate. Thus a simple, but effective, test of the freedom of the gyroscope structure to precess, can be readily achieved by observing the representation of angular rate provided by the rate gyroscope when each electromagnet is energized in turn. This test may be combined with another test that seeks to determine whether the rotor of the rate gyroscope is rotating at the desired operational speed.

In this latter connection, the rate gyroscope may be included in an arrangement that also includes a selectively-operable direct-current supply circuit for supplying direct current to the two electromagnets one at a time, detector means for detecting whether the rotor of the gyroscope is rotating at operational speed, and means coupled to the detector means for inhibiting operation of the direct-current supply circuit unless the rotor is rotating at the operational speed. The rate gyroscope may include a synchronous alternating-current electric motor (for example a hysteresis motor) for driving the rotor, and in these circumstances the detector means may be arranged to detect whether the motor is driving the rotor at synchronous speed by detecting whether there is amplitude modulation of alternating current supplied to energize the motor.

The ferromagnetic means may be a ferromagnetic member that is carried by the gimbal structure to extend perpendicularly to the precession axis. In particular, this ferromagnetic member may be a ferromagnetic spindle forming part of the mounting of the rotor on the gimbal structure and extending lengthwise of the axis of spin of the rotor.

The two electromagnets may each be of annular form having a pair of diametrically-opposed poles, and in these circumstances the two electromagnets may be disposed to embrace the gimbal structure about the precession axis, with the pair of poles of one of the electromagnets angularly displaced about this axis with respect to the pair of poles of the other electromagnet. The two electromagnets may be provided externally of a casing that encloses the gimbal structure, and in these circumstances are preferably provided in an assembly that is adapted to fit on the casing and be secured releasably thereto. In this connection, and in accordance with another aspect of the present invention, an electromagnet assembly for use with a rate gyroscope comprises two electromagnets each of which is of annular form and has a pair of diametrically-opposed poles, and means carrying the two electromagnets for mounting the assembly on the rate gyroscope with the rate gyroscope embraced by the electromagnets, the two electromagnets being carried by the mounting means in axial alignment with one another and with the pair of poles of one of the two electromagnets angularly displaced with respect to the pair of poles of the other about the common axis of the electromagnets.

An arrangement that includes a rate gyroscope in accordance with the present invention, will now be described, by way of example, with reference to the accompanying drawings, in which:

FIGURE 2 is a cross-section of the rate gyroscope taken on the line II—II of FIGURE 1;

FIGURE 3 is an enlarged sectional view of the rotor of the rate gyroscope;

Figure 1:
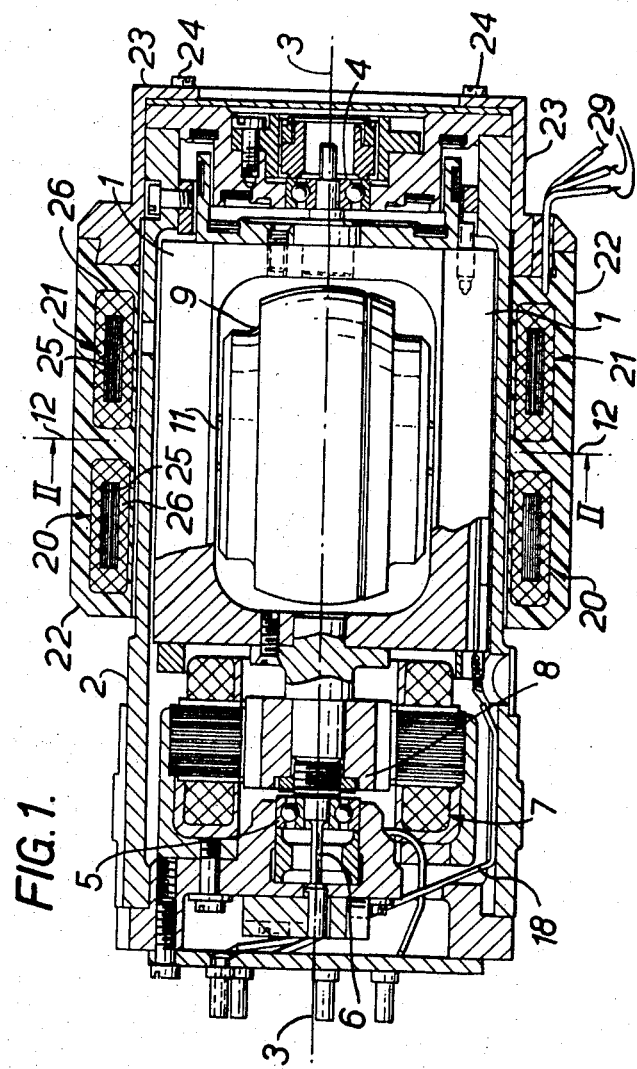
FIGURE 1 is a longitudinal section of the rate gryoscope.

Referring to FIGURES 1 and 2, a gimbal structure 1 of the rate gyroscope is rotatably mounted within a cylindrical casing 2 for angular displacement about the longitudinal axis 3 of the casing 2. The structure 1 is mounted by means of a bearing 4 at one end of the casing 2 and by means of a bearing 5 and a torsion bar 6 at the other end, the torsion bar 6 providing a resilient restraint opposing angular displacement of the structure 1 about the axis 3. An electromagnetic pick-off that comprises a stator 7 carried by the casing 2 and a ferromagnetic rotor 8 carried by the structure 1, is arranged to be excited with alternating electric current so as to derive in the stator 7 a signal dependent upon any angular displacement of the structure 1 about the axis 3.

A rotor 9 of the rate gyroscope is carried by the gimbal structure 1, being rotatably-mounted on a steel spindle 11 that is secured to the structure 1 with its longitudinal axis 12 perpendicular to the axis 3. As shown in detail in FIGURE 3, the rotor 9 comprises a two-part non-ferromagnetic shell 13 that is mounted coaxially on the spindle 11 by means of bearings 14 and 15, and a tungsten-steel ring 16 that is carried coaxially within the shell 13. The ring 16 forms the rotor of an electrical three-phase hysteresis motor which has its stator windings 17 secured on the spindle 11 within the ring 16 and which provides, via the ring 16, the drive for rotating the rotor 9 about the axis 12. Electrical supply to the three-phase stator windings 17 is made via three leads 18 that extend along the axis 12 within the spindle 11.

The rate gyroscope as so far described functions in the conventional manner; any angular movement of the casing 2 about an axis 19 (FIGURE 2), which axis being perpendicular to the two axes 3 and 12 constitutes the input axis of the rate gyroscope, tends to precess the gimbal structure 1 about the axis 3 (the precession axis of the gyroscope). Precession about the axis 3 is restrained resiliently by the torsion bar 6 so that the resultant angular displacement about the precession axis 3 is in accordance with the angular velocity of the case 2 about the axis 19. A measure of this angular velocity is accordingly provided by the electric signal derived in the stator 7 of the electromagnetic pick-off.

Correct operation of the rate gyroscope depends upon the existence of two main conditions, one, rotation of the rotor 9 at synchronous speed about its spin axis 12, and the other, freedom of the gimbal structure 1 to precess about the axis 3 against the restraint provided by the torsion bar 6. The present arrangement enables tests to be made to check the existence of both of these conditions, and involves the use of two electromagnets 20 and 21 mounted externally of the non-ferromagnetic casing 2 of the rate gyroscope.

The electromagnets 20 and 21 embrace the casing 2 and are symmetrically disposed on opposite sides of the plane containing the spin and input axes 12 and 19, the two electromagnets 20 and 21 being encapsulated togteher in epoxy resin to form a generally-annular assembly 22. The assembly 22 has a non-ferromagnetic end-cap 23 that is secured by screws 24 to one end of the casing 2, and this serves to locate and retain the electromagnets 20 and 21 in position relative to the rotor 9.

Figure 4:
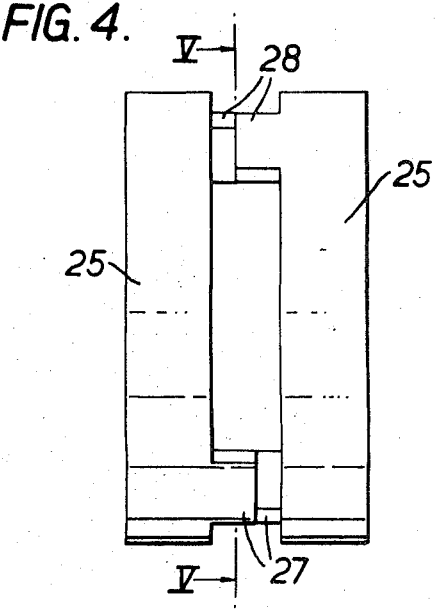
FIGURE 4 shows in side elevation the disposition with respect to one another of two annular ferromagnetic yokes that provide the cores of two electromagnets in an electromagnet assembly of the rate gyroscope.
Figure 5:
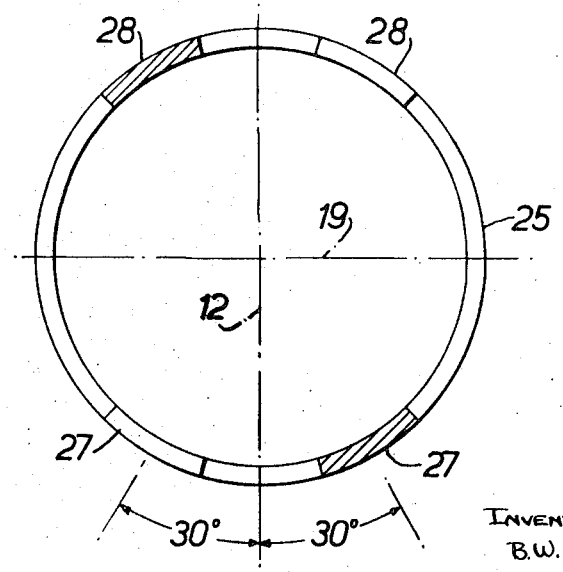
FIGURE 5 is a sectional end view taken on the line V—V of FIGURE 4.

Each electromagnet 20 and 21 is formed by an annular yoke 25 of high-permability magnetic material (for example, soft-iron) that is provided with a toroidally-wound electrical winding 26 around nearly its whole circumference. As shown in FIGURES 4 and 5, each yoke 25 has a pair of diametrically-opposed poles 27 and 28 that both extend laterally, parallel to the axis 3, towards the other yoke 25. The yokes 25 are held within the assembly 22 in axial alignment with one another but, as shown more especially in FIGURES 2 and 5, with the pair of poles 27 and 28 of one effectviely overlapping, and angularly displaced with respect to, the poles 27 and 28 of the other. The angular separation between the poles 27 and between the poles 28 (measured as indicated in FIGURE 5, between centres of the relevant poles) is in each case sixty degrees, and the end-cap 23 is mounted on the casing 2 such that each pole 27 and 28 is angularly displaced from the spin axis 12 by thirty degrees about the precession axis 3.

The windings 26 of the two electromagnets 20 and 21 are arranged to be supplied, one at a time, with direct electric current via leads 29. Supply of direct current in this manner to either electromagnet 20 and 21 produces a magnetic field between the relevant pair of poles 27 and 28 that, acting upon the ferromagnetic spindle 11, applies to the gimbal structure 1 (the main body of which is non-ferromagnetic) a torque about the axis 3. This torque tends to rotate the gimbal structure 1 through thirty degrees in one sense or the other about the axis 3, but rotation is in fact limited by stops to two degrees; the sense of the applied torque is dependent upon which of the electromagnets 20 and 21 is energized. Thus, provided the structure 1 is free for precession about the axis 3, energization of either electromagnet 20 and 21 will cause the gimbal structure 1 to be angularly displaced about the axis 3 against the restraint imposed by the torsion bar 6. Such rotation is represented by, and therefore can be observed from, the signal supplied from the stator 7 of the electromagnetic pick-off.

In the present arrangement, energization of the electromagnets 20 and 21 is enabled only while the rotor 9 is rotating at synchronous speed about its spin axis 12. To this end, the arrangement includes an electrical speed-detector that is responsive to an electric signal appearing in the electrical three-phase supply circuit of the stator windings 17 when the rotor 9 is rotating at synchronous speed. The circuit of the electrical speed-detector, and the manner in which it is connected to the supply circuit of the stator windings 17 and serves to enable energization of the electromagnets 20 and 21 only when the rotor 9 is rotating at synchronous speed, will now be described with reference to FIGURE 6.

Figure 6:
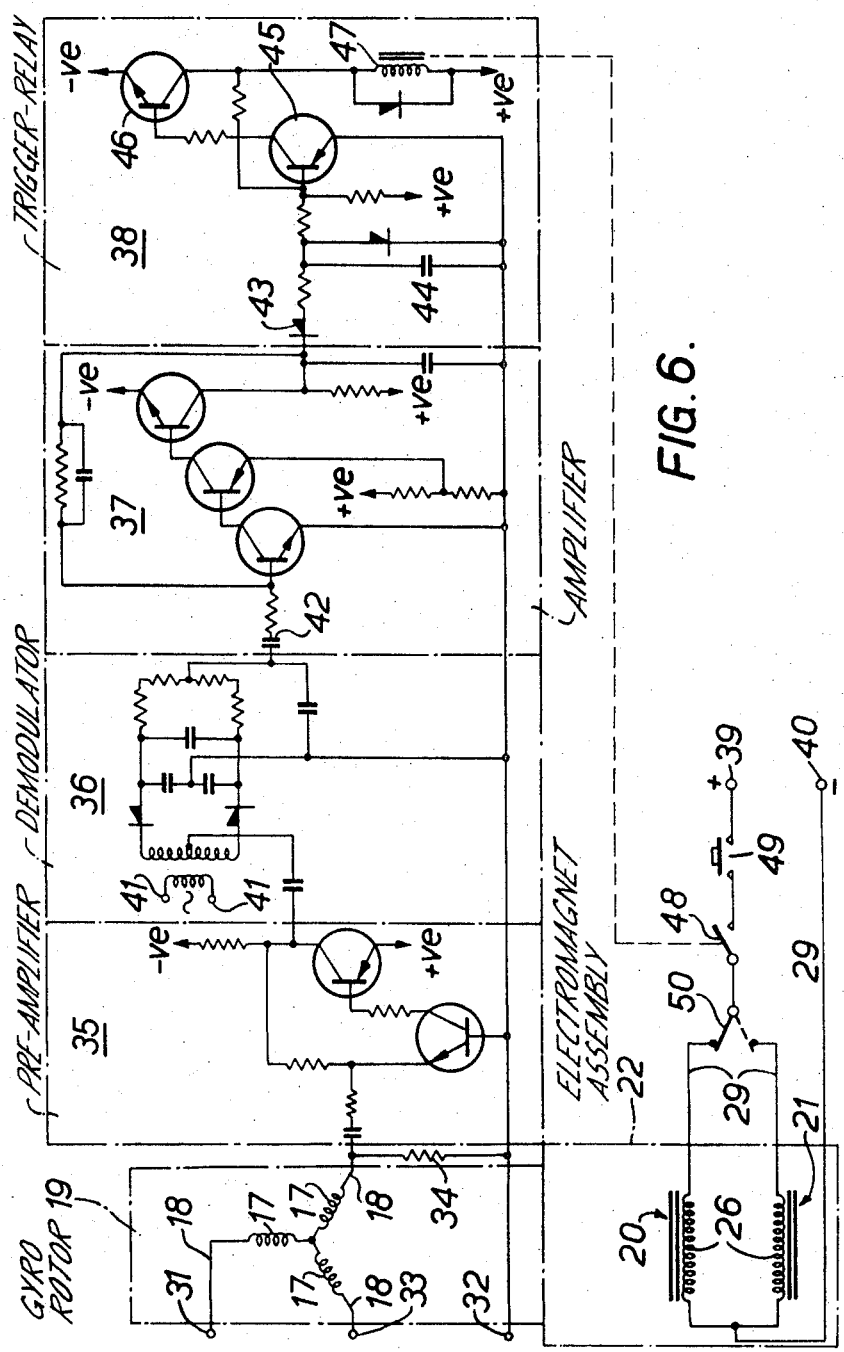
FIGURE 6 shows the electrical circuit of the arrangement including the rate gyroscope of FIGURES 1 to 5.

Referring to FIGURE 6, the three stator windings 17 of the rate gyroscope are energized, at a frequency of four hundred cycles per second, from a three-phase alternating-current supply source (not shown), the three phases of such source being connected to terminals 31 to 33 respectively. The terminals 31 and 33 are connected directly to two of the three supply leads 18, whereas the terminal 32 is connected to the third lead 18 through a resistor 34. When the windings 17 are energized from the terminals 31 to 33 and the rotor 9 rotates synchronously, the motion of the rotor 9 (owing to its comparatively large inertia) is modulated by an oscillation of low frequency, and this oscillation, as reflected back electromagnetically into the stator windings 17, gives rise to a corresponding amplitude-modulation of the alternating-current signal appearing across the resistor 34. The signal appearing across the resistor 34 is modulated in this manner only while the rotor 9 is rotating at synchronous speed. The speed-detector, which comprises four stages 35 to 38, acts to detect the existence of the modulation and, in accordance therewith, to enable supply of direct current to one or the other of the electromagnets 20 and 21 from a direct-current source (not shown) connected across terminals 39 and 40.

The first stage 35 of the speed-detector is a pre-amplifier stage that provides amplification of the modulated signal appearing across the resistor 34 and passes it to the second stage 36. The second stage 36 is a demodulator stage which has two terminals 41 that are connected to the same phases of the three-phase supply as the terminals 31 and 32 respectively. The signal derived in the demodulator stage 36 and corresponding to the modulation component appearing across the resistor 34, is supplied to the third, amplifying, stage 37 via a capacitor 42. After amplification in the stage 37 the signal is passed to the final, trigger-and-relay, stage 38 of the speed-detector. Within the stage 38 the signal is supplied via a rectifier 43 and thence across a capacitor 44 to the base electrode of a P-N-P junction transistor 45. The transistor 45 is normally non-conductive and has its collector electrode connected directly to the base electrode of an N-P-N junction transistor 46 so that the transisor 46 is conductive only while the transistor 45 conducts. Only the negative-going half-cycles of the signal supplied through the amplifying stage 37 are passed by the rectifier 43, and the resulting unidirectional signal appearing across the capacitor 44 causes the transistor 45 to become fully conductive. This in its turn causes the transistor 46 to become fully conductive to energize a relay winding 47 connected as its collector load. The capacitors 42 and 44 together act to ensure an overall time constant of operation of the speed-detector of some eight seconds.

The relay winding 47 controls the closing of a relay contact 48 connected in the direct-current supply circuit for the electromagnets 20 and 21. In this circuit, connection is made to the contact 48 from the terminal 39 via a manually-operable switch 49, and thence to the terminals 40 through one or the other of the windings 26, the particular one of the windings 26 involved being dependent upon the setting of a two-position selector switch 50. The contact 48 remains open, and thereby inhibits supply of energization current to the selected winding 26, until such time as the relay winding 47 is energized, that is to say, until the appropriate low-frequency modulation component is detected across the resistor 34.

When the modulation component is detected and the relay winding 47 is accordingly energized, the contact 48 is closed, thereby enabling the energization of the selected winding 26. Thus, provided the rotor 9 is rotating at synchronous speed, closure of the switch 49 by an operator is effective to energize the electromagnet assembly 22. If at this time the gimbal structure 1 is free for precession, this energization gives rise to an output signal from the rate gyroscope that is observable from the instruments connected to the rate gyroscope for its operational role, or from a meter specially connected to the pick-off stator 7. Freedom for precession in both senses can be checked simply by switching the selector switch 50 from one of its two positions to the other while the switch 49 is closed. In the event of a fault such that the rotor 9 does not rotate at synchronous speed and, or alternatively, such that the gimbal structure 1 is not free for precession, there is no output signal from the rate gyroscope while the switch 49 is closed.

Where the rate gyroscope is mounted in a craft, for example in an aircraft, the electrical speed-detector together with the energization circuit for the electromagnets 20 and 21 may be provided as test equipment for use and connection to the rate gyroscope only when it is desired to make the tests. The speed-detector and energization circuit quite clearly may be common to a number of rate gyroscopes, connection to each rate gyroscope being made in turn during test. In this latter respect, it is preferably arranged, by means of extra circuitry, that the capacitors 42 and 44 of the speed-detector are discharged rapidly between tests of successive rate gyroscopes; this avoids waste of time that would otherwise be necessary between tests in view of the somewhat long time constant (eight seconds) provided by these capacitors 42 and 44.

The electromagnet assembly 22, comprising the electromagnets 20 and 21 and the end-cap 23, is normally retained on the rate-gyroscope, but can of course be removed simply by unscrewing the screws 24 if so desired. The fact that the electromagnet assembly 22 is fitted externally of the casing 2 is of course an advantage in that it allows it to be readily fitted and removed from the rate gyroscope as required.

We claim:
1. In a rate gyroscope having a rotor, a gimbal structure carrying the rotor for precession about an axis, and resilient means coupled to the gimbal structure for opposing precession about the said precession axis: ferromagnetic means carried by the gimbal structure, two electromagnets that are individually energizable with direct electric current for attracting said ferromagnetic means magnetically about said precession axis, the magnetic attraction due to each said electromagnet acting on said ferromagnetic means with moment about said precession axis for angularly displacing the gimbal structure about said precession axis, and means mounting the two electromagnets about said precession axis to attract said ferromagnetic means in opposite senses about said precession axis.

2. A rate gyroscope according to claim 1 wherein each electromagnet has two diametrically-opposed poles, and the mounting means mounts each electromagnet with its two poles diametrically-opposed to one another about the precession axis.

3. A rate gyroscope according to claim 1 wherein a casing encloses the gimbal structure, and the mounting means mounts the two electromagnets externally of the casing.

4. In a rate gyroscope having a rotor, a gimbal structure carrying the rotor for precession about an axis, and resilient means coupled to the gimbal structure for opposing precession about said axis: ferromagnetic means carried by the gimbal structure, two electromagnets that are individually energizable with direct electric current for exerting magnetic attraction on said ferromagnetic means, the magnetic attraction due to each electromagnet acting on said ferromagnetic means with moment about said axis of precession for angularly displacing the gimbal structure about said axis, and means mounting the two electromagnets to attract said ferromagnetic means in opposite senses about said precession axis, each said electromagnet being of annular form and having a pair of diametrically-opposed poles, said mounting means mounting the two electromagnets in axial alignment with one another and with the pair of poles of one of the two electromagnets angularly displaced with respect to the pair of poles of the other electromagnet about said precession axis.

5. In a rate gyroscope having a rotor, a gimbal structure carrying the rotor for precession about an axis, and resilient means coupled to the gimbal structure for opposing precession about said axis: ferromagnetic means carried by the gimbal structure, two electromagnets that are individually energizable with direct electric current for exerting magnetic attraction on said ferromagnetic means, the magnetic attraction due to each electromagnet acting on said ferromagnetic means with moment about said axis of precession for angularly displacing the gimbal structure about said axis, and means mounting the two electromagnets to attract said ferromagnetic means in opposite senses about said precession axis, said ferromagnetic means comprising a ferromagnetic spindle that carries said rotor, said spindle being mounted on said gimbal structure to extend perpendicularly to said precession axis.

6. In combination: a rate gyroscope having a rotor, a gimbal structure carrying the rotor for precession about an axis, resilient means coupled to the gimbal structure for opposing precession about said axis, said rate gyroscope including ferromagnetic means carried by the gimbal structure, two electromagnets that are individually energizable with direct electric current for exerting magnetic attraction on said ferromagnetic means, the magnetic attraction due to each electromagnet acting on said ferromagnetic means with moment about said axis of precession for angularly displacing the gimbal structure about said axis, and means mounting the two electromagnets to attract said ferromagnetic means in opposite senses about said precession axis; a selectively-operable direct-current supply circuit for supplying direct current to the two electromagnets one at a time; detector means for detecting whether the rotor of the gyroscope is rotating at a predetermined operational speed; and means coupled to the detector means for inhibiting operation of the direct-current supply circuit unless the rotor is rotating at said operational speed.

7. The combination according to claim 6 wherein the rate gyroscope includes a synchronous alternating-current electric motor for driving the rotor of the gyroscope, and the combination includes circuit means for supplying alternating current to energize the electric motor, means coupled to the alternating-current energization circuit for detecting amplitude modulation of the alternating current supplied to the motor, and means for inhibiting operation of the direct-current supply circuit unless said amplitude modulation is detected.

8. A rate gyroscope comprising a gimbal structure mounted for angular displacement about a precession axis of the gyroscope, a rotor, means mounting the rotor on the gimbal structure for rotation about a spin axis perpendicular to said precession axis, the rotor-mounting means including a ferromagnetic spindle extending lengthwise of said spin axis, means for driving the rotor about said spin axis, a resilient restraint for opposing angular displacement of the gimbal structure about said precession axis, pick-off means for providing a signal dependent upon angular displacement of the gimbal structure about said precession axis, two electromagnets that are individually energizable to exert magnetic attraction on said spindle, and means mounting the two electromagnets about the precession axis for exerting said attraction on the spindle with moment about said precession axis, the sense of said moment being dependent upon which of the two electromagnets is energized.

9. A rate gyroscope comprising a gimbal structure mounted for angular displacement about a precession axis of the gyroscope, a rotor, means mounting the rotor on the gimbal structure for rotation about a spin axis perpendicular to said precession axis, the rotor-mounting means including a ferromagnetic spindle extending lengthwise of said spin axis, means for driving the rotor about said spin axis, a resilient restraint for opposing angular displacement of the gimbal structure about said precession axis, pick-off means for providing a signal dependent upon angular displacement of the gimbal structure about said precession axis, two electromagnets that are individually energizable to exert magnetic attraction on said spindle, and means mounting the two electromagnets about the precession axis for exerting said attraction on the spindle with moment about said precession axis in a sense dependent upon which of the two electromagnets is energized, each said electromagnet comprising an annular, ferromagnetic yoke that embraces the gimbal structure, said yoke having a pair of diametrically-opposed poles, and a toroidally-wound electrical winding on the yoke, said electromagnet-mounting means mounting the two yokes in axial alignment with one another and with the pair of poles of one of the yokes angularly displaced with respect to the pair of poles of the other yoke about the precession axis.

10. In combination, a rate gyroscope according to claim 9, a selectively-operable direct-current supply circuit connected to the windings of the two electromagnets for supplying direct current to energize the two electromagnets one at a time, detector means for detecting whether the rotor of the gyroscope is rotating at a predetermined operational speed, and means coupled to the detector means for inhibiting operation of the direct-current supply circuit unless the rotor is rotating at said operational speed.

11. The combination according to claim 10 wherein said means for driving the rotor is an electrical hysteresis motor, the motor having three-phase electrical windings that are energizable with three-phase alternating current to drive the rotor, and the combination includes a resistance connected in series with one of the three-phase windings to derive an alternating-current signal dependent upon current flowing in the three-phase windings, means for detecting amplitude-modulation of the alternating-current signal, and means for inhibiting operation of the direct-current supply circuit unless amplitude modulation of the alternating-current signal is detected.

12. In combination: a rate gyroscope comprising a gimbal structure mounted for angular displacement about a precession axis of the gyroscope, a rotor mounted on the gimbal structure for rotation about a spin axis perpendicular to said precession axis, means for driving the rotor about said spin axis, a resilient restraint for opposing angular displacement of the gimbal structure about said precession axis, pick-off means for providing a representation of any angular displacement of the gimbal structure about said precession axis, ferromagnetic means carried by the gimbal structure, two electromagnets that are individually energizable with direct electric current for exerting magnetic attraction on said ferromagnetic means, said magnetic attraction due to each electromagnet acting on said ferromagnetic means with moment about said precession axis for angularly displacing the gimbal structure about said precession axis, and means mounting the two electromagnets to attract said ferromagnetic means in opposite senses about said precession axis; a selectively-operable direct-current supply circuit for supplying direct current to energize the two electromagnets one at a time, the supply circuit including a switch device that is switchable from a first state, in which it inhibits supply of direct current to the electromagnets, to a second state in which it enables the supply of direct current; and detector means for detecting whether the rotor of the rate gyroscope is rotating at a predetermined speed, said detector means including means for switching the said switch device from the first state to the second state only when the rotor is rotating at said predetermined speed.

13. In a rate gyroscope having a rotor, a gimbal structure carrying the rotor for precession about an axis, and resilient means coupled to the gimbal structure for opposing precession about the precession axis; magnetically-attractable means carried by the gimbal structure, two electromagnets that are individually energizable with direct electric current to attract the magnetically-attractable means, and means mounting the two electromagnets about said precession axis to exert attraction on said magnetically-attractable means in opposite senses about said precession axis, said mounting means mounting each said electromagnet to exert said attraction with moment about said precession axis for angularly displacing said gimbal structure about said axis.

References Cited

UNITED STATES PATENTS

| | | | |
|---|---|---|---|
| 2,847,664 | 8/1958 | Lewis | 74—5.6 |
| 2,864,255 | 12/1958 | Stern et al. | 74—5.4 |
| 3,218,872 | 11/1965 | Swainson | 74—5.6 |
| 3,260,122 | 7/1965 | Rocks | 74—5.6 |
| 3,282,081 | 11/1966 | Boskovich et al. | 74—5.6 |

FOREIGN PATENTS 1,408,433   7/1965   France.

FRED C. MATTERN, Jr., Primary Examiner

MANUEL ANTONAKAS, Assistant Examiner

U.S. Cl. X.R.

74—5.6